A. E. ROOT.
COMBINATION TENONING AND BORING MACHINE.
APPLICATION FILED JULY 21, 1908.
922,338.
Patented May 18, 1909.
2 SHEETS—SHEET 1.
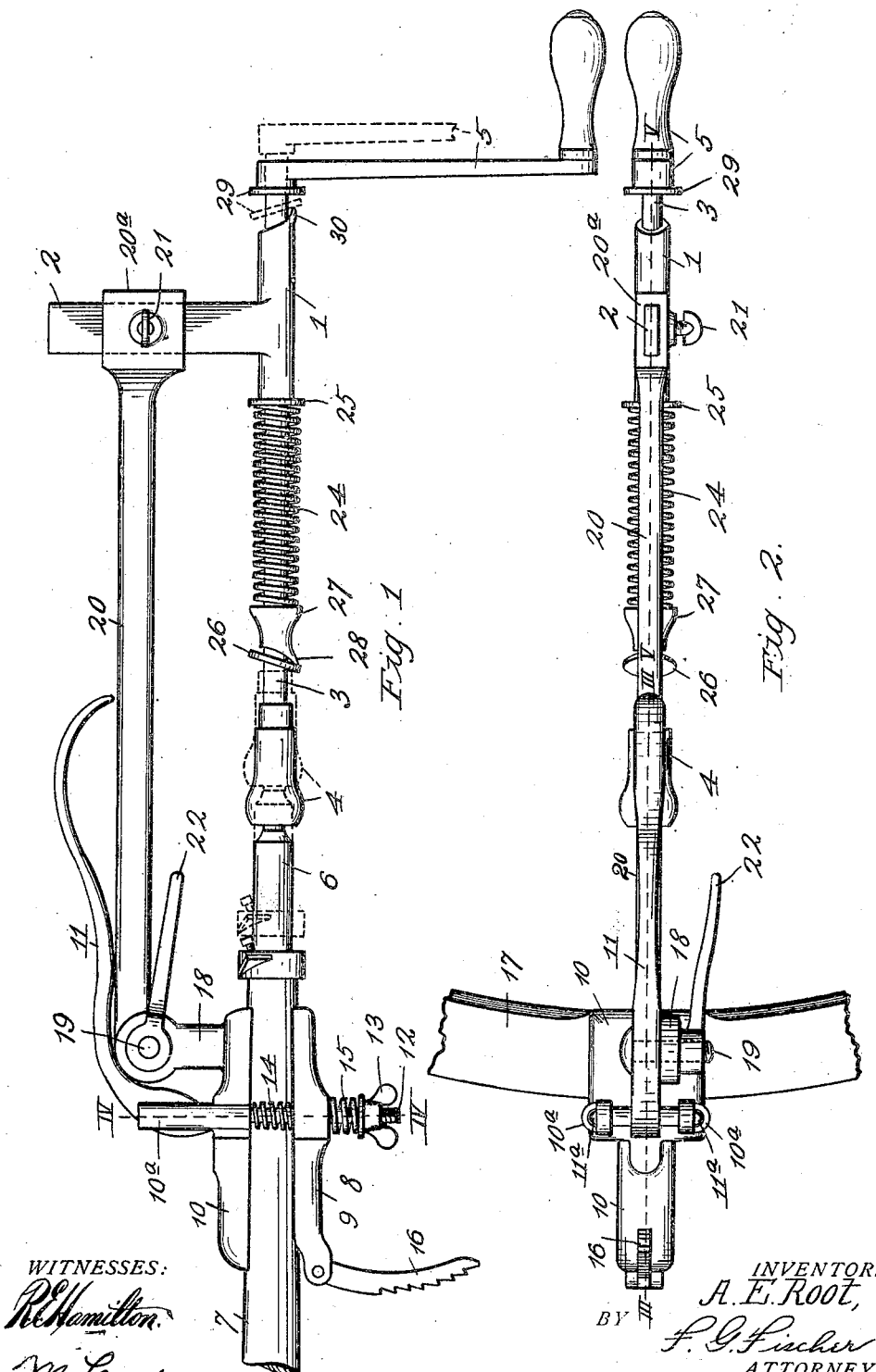
WITNESSES:
R. E. Hamilton.
M. Cox
INVENTOR.
A. E. Root,
BY
F. G. Fischer
ATTORNEY.

A. E. ROOT.
COMBINATION TENONING AND BORING MACHINE.
APPLICATION FILED JULY 21, 1908.
922,338.
Patented May 18, 1909.
2 SHEETS—SHEET 2.
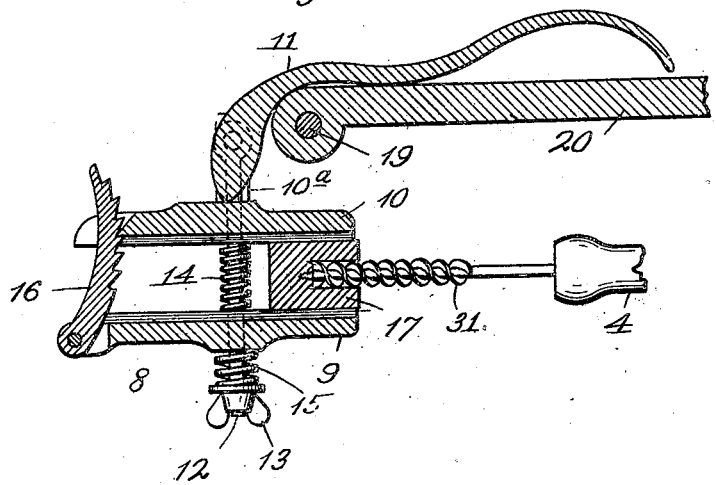
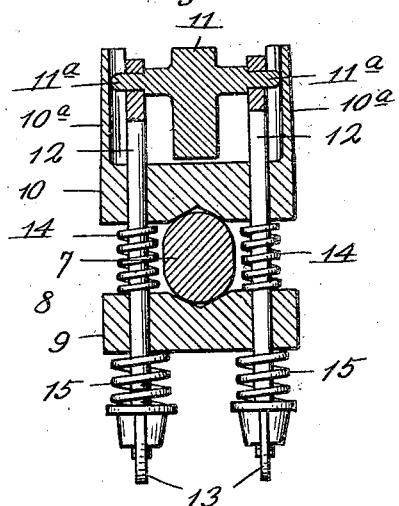
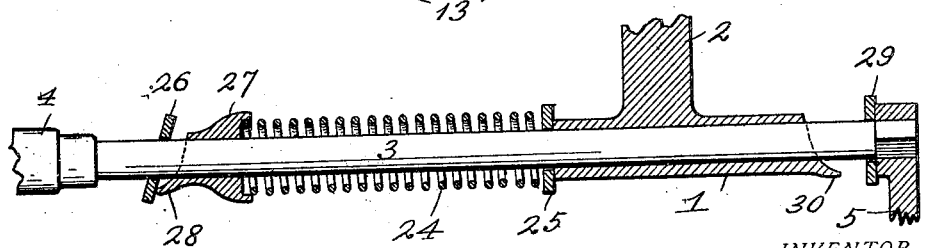
WITNESSES:
INVENTOR.
A. E. Root,
BY
F. G. Fischer,
ATTORNEY.

UNITED STATES PATENT OFFICE.

ALVA E. ROOT, OF PLEASANTON, KANSAS, ASSIGNOR OF ONE-HALF TO WILLIAM M. LAYTON, OF PLEASANTON, KANSAS.

COMBINATION TENONING AND BORING MACHINE.

No. 922,338.      Specification of Letters Patent.      Patented May 18, 1909.

Application filed July 21, 1908. Serial No. 444,659.

*To all whom it may concern:*

Be it known that I, ALVA E. ROOT, a citizen of the United States, residing at Pleasanton, in the county of Linn and State of Kansas, have invented certain new and useful Improvements in Combination Tenoning and Boring Machines, of which the following is a specification.

My invention relates to improvements in combination tenoning and boring machines, and my object is to provide a simple machine of this character whereby the work of forming tenons on spokes and the boring of fellies to receive said tenons may be easily and rapidly performed. The machine is adjustable so that tenons may be cut at any angle for spokes to be used in dished wheels.

In order that the invention may be fully understood, reference will now be made to the accompanying drawings, in which:

Figure 1 represents a side elevation of the machine in the act of cutting a tenon on the end of a spoke. Fig. 2 is a plan view of the machine in the act of boring a hole in a felly to receive the tenon. Fig. 3 is an enlarged broken section on line III—III of Fig. 2. Fig. 4 is an enlarged cross section on line IV—IV of Fig. 1. Fig. 5 is an enlarged broken longitudinal section on line V—V of Fig. 2, with some of the parts removed.

In carrying out the invention, I employ a bearing 1, provided with an integral upright arm 2, and a rotatable and slidable drill-stock 3, which is provided at its forward end with a chuck 4, and at its rear end with a crank 5 whereby it may be rotated.

6 designates a hollow auger of ordinary construction, removably carried by chuck 4 for the purpose of cutting a tenon on the end of spoke 7, which is reliably held in position by a clamp 8. Said clamp consists of a lower jaw 9, an upper jaw 10, and a cam-lever 11 for forcing the jaws tightly into contact with the spoke, as shown in Fig. 1. Jaws 9 and 10 are loosely connected by a pair of eye-bolts 12 provided at their lower ends with winged-nuts 13 whereby the jaws are adjusted to receive spokes of different diameters and to regulate the tension of a plurality of expansion springs hereinafter described.

Cam-lever 11 is provided at its forward end with trunnions 11ª, fulcrumed in the eye-bolts and extending into a pair of grooved guides 10ª, on jaw 10, to relieve the eye-bolts of any lateral strain the cam-lever might exert thereon while being depressed.

The jaws are normally held apart by a pair of expansion springs 14, and I also place a pair of springs 15 between the nuts 13 and the lowermost jaw 9 to enable the cam-lever to be fully depressed after the jaws have been firmly brought into contact with the spoke. Lowermost jaw 9 is provided with a ratchet-bar 16 which acts as a fulcrum for the upper jaw 10 when gripping the felly 17, as shown in Figs. 2 and 3.

When it is desired to grip a spoke, ratchet-bar 16 is thrown downward to an inoperative position as shown in Fig. 1, so as to be out of the way of the spoke.

Jaw 10 of the clamp is provided with an upwardly-extending lug 18 carrying a screw 19 upon which an adjusting-rod 20 is pivotally secured, said adjusting-rod having a sleeve 20ª slidably engaging arm 2 and provided with a set-screw 21 adapted to engage said arm. This arrangement permits the clamp to be set at an angle with respect to the auger, so that the tenon may be cut at an angle to the spoke when the latter is to be used in a dished wheel. After the clamp has been set at the desired angle it is reliably held by a locking-lever or tail nut 22, adjustably engaging screw 19.

The auger is pushed forward during the operation of cutting the tenon, by means of an expansion spring 24, bearing at its rear end against a washer 25 and at its forward end against a lock comprising a washer 26 and a sleeve 27, which latter is provided with a forward extension 28, which throws washer 26 obliquely to stock 3, and causes it to bite the same. This arrangement forms convenient means for tensioning spring 24 so that the latter will force the auger forward and thus relieve the operator of this work.

After the tenon has been cut on the spoke the operator grasps auger 6 and pushes the same backward, together with stock 3, as indicated by dotted lines, Fig. 1, preparatory to cutting a tenon on another spoke. When the auger and the stock are pushed backward, as above described, they are held in this position by a lock consisting of a washer 29, which is pushed forward against a rearward extension 30, which tilts the washer obliquely to stock 3, and thus causes it to bite and hold the same in its rearmost position.

When it is desired to bore holes in the fellies to receive the tenons, a bit 31 is substituted for the hollow auger 6.

From the above description it is apparent that I have produced a machine which is simple in construction, easy of operation, and whereby considerable work may be accurately and quickly performed by a single operator.

Having thus described my invention, what I claim is:

1. A wood working tool comprising in combination with a frame, a drill stock having a bearing therein, an overhanging clamp positioned in front of said drill stock, and means for varying the vertical inclination thereof with respect to said drill stock, said clamp comprising upper and lower jaws, eyebolts upon which said jaws are slidable coil springs carried on said bolts between said jaws to tension them apart, coil springs carried below said lower jaw to tension said jaw against said first spring, nuts threaded on said bolts to retain and regulate the tension of said coil springs, a cam lever trunnioned in said eye-bolts and bearing on said upper jaw, and a serrated lever pivoted to the rear of one of said jaws and adapted for engagement by the other jaw, to brace said jaws when the forward lips thereof are used.

2. A wood working tool comprising in combination with a frame, a drill stock having a bearing therein, an overhanging clamp positioned in front of said drill stock, said clamp comprising upper and lower jaws, means for varying the vertical inclination of said clamp, and means comprising a serrated lever pivoted to the lower jaw of said clamp and adapted for engagement by its serrations with the upper jaw of said clamp, for bracing the rear of said clamp when only the forward lips thereof are used.

3. A wood working tool, comprising, in combination with a frame, a drill stock having a sliding and rotary bearing therein, and a clamp overhanging said stock and positioned in front thereof, said stock having means for automatically fixing it in its sliding relation to said bearing, said means comprising lock-washers disposed on each side of said bearing, a collar having a one point bearing against the forward washer, an expansion spring carried on said stock and acting against said collar and bearing, and a one point bearing formed on the rear of said bearing and acting against the rear washer, said washers, under tension of said spring and canted by said one point bearings, acting to hold said stock fixed in its sliding relation to said bearing.

In testimony whereof I affix my signature, in the presence of two witnesses.

ALVA E. ROOT.

Witnesses:
F. G. FISCHER,
M. COX.